United States Patent
Iwata et al.

(10) Patent No.: US 6,735,446 B1
(45) Date of Patent: May 11, 2004

(54) MOBILE COMMUNICATION SYSTEM AND A CONTROL UNIT OF THE SYSTEM FOR EFFICIENT USE OF VACANT CHANNELS IN ONE-WAY COMMUNICATION

(75) Inventors: Yasuharu Iwata, Kawasaki (JP); Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 09/718,144

(22) Filed: Nov. 21, 2000

(30) Foreign Application Priority Data

Mar. 27, 2000 (JP) ........................................ 2000-086703

(51) Int. Cl.$^7$ ................................................ H04B 7/14
(52) U.S. Cl. .................... 455/518; 455/517; 455/519; 370/327
(58) Field of Search ................................ 455/518, 519, 455/517, 17; 370/327

(56) References Cited

U.S. PATENT DOCUMENTS

| | | | | |
|---|---|---|---|---|
| 4,682,367 A | * | 7/1987 | Childress et al. | 455/17 |
| 4,821,310 A | * | 4/1989 | Lynk et al. | 455/517 |

FOREIGN PATENT DOCUMENTS

| | | | | |
|---|---|---|---|---|
| JP | 0102630 | * | 1/1989 | H04B/7/26 |
| JP | 64-12630 | | 1/1989 | |
| JP | 6-350527 | | 12/1994 | |
| JP | 8-274701 | | 10/1996 | |
| JP | 3-102925 | | 2/1999 | |

* cited by examiner

Primary Examiner—Nay Maung
Assistant Examiner—Alan T. Gantt
(74) Attorney, Agent, or Firm—Katten Muchin Zavis Rosenman

(57) ABSTRACT

In a mobile communication system, a central control unit assigns pairs of upstream and downstream channels to mobile station units located in a radio zone of a base station unit to carry out a two-way communication between the mobile station units, and the central control unit assigns pairs of upstream and downstream channels to the mobile station units to carry out a one-to-multiple group communication between the mobile station units. A memory unit stores vacant channel data indicative of the presence of a vacant channel with respect to the group communication carried out by the channel assignment of the central control unit. A broadcast message unit transmits a broadcast message containing the vacant channel data, stored in the memory unit, to each of the mobile station units. A message receiving unit receives the broadcast message transmitted by the broadcast message unit. A call request transmission unit transmits, when the vacant channel data of the received message indicates the presence of the vacant channel, a call request for a one-way communication using the vacant channel, to the base station unit. The central control unit assigns the vacant channel to one of the mobile station units in response to a call request for a one-way communication using the vacant channel, which is sent by one of the mobile station units, and updates the vacant channel data, stored in the memory unit, as a result of the assignment of the vacant channel.

9 Claims, 16 Drawing Sheets

TO CENTRAL CONTROL UINT

FIG.5A

| 1ST UNIT | LP | R | P | CAC | SW | I | CC | CAC | |

| 2ND UNIT | LP | R | CAC | SW | I | CC | CAC | G |

| R | P | CAC/E | SW | CI | CC | CAC/E | I |

FIG.6A

| R | P | TCH (FACCH) | SW | I | CC | SACCH (RCH) | TCH (FACCH) | G |

FIG.6B

| R | P | TCH (FACCH) | SW | I | CC | SACCH (RCH) | TCH (FACCH) | B/I |

FIG.9

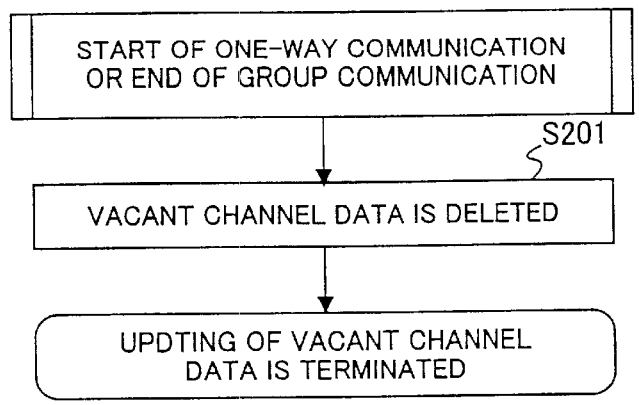

START OF ONE-WAY COMMUNICATION OR END OF GROUP COMMUNICATION

↓ S201

VACANT CHANNEL DATA IS DELETED

↓

UPDTING OF VACANT CHANNEL DATA IS TERMINATED

FIG.10

| DATA ELEMENTS | UP/DN DIRECTION | KIND M:MANDATORY O:OPTION | LENGTH (OCTET) |
|---|---|---|---|
| MESSAGE KIND | DN | M | 1 |
| NO. OF VACANT CHANNELS | DN | M | 1 |
| GROUP NO.1 | DN | O | 1 |
| CARRIER FREQUENCY NO.1 | DN | O | 2 |
| CHANNEL NO.1 | DN | O | 1 |
| ... | ... | ... | ... |
| GROUP NO.n | DN | O | 1 |
| CARRIER FREQUENCY NO.n | DN | O | 2 |
| CHANNEL NO.n | DN | O | 1 |

FIG.15

| I/B | R/N | PE |
|-----|-----|----|

FIG.16

| DATA ELEMENTS | UP/DN DIRECTION | KIND M:MANDATORY O:OPTION | LENGTH (OCTET) | REMARKS |
|---|---|---|---|---|
| MESSAGE KIND | UP | M | 1 | ONE-WAY COMM CALL REQUEST |
| MOBILE-STATION KIND | UP | M | 3 | |
| RECEIVING LEVEL | UP | M | 1 | RADIO-ZONE RECEIVING LEVEL |

FIG.18

| DATA ELEMENTS | UP/DN DIRECTION | KIND M:MANDATORY O:OPTION | LENGTH (OCTET) | REMARKS |
|---|---|---|---|---|
| MESSAGE KIND | DN | M | 1 | RADIO CHANNEL DESIGNATION |
| FREQUENCY CODE | DN | M | 2 | |
| SLOT NO. | DN | M | 1 | |
| SCRAMBLE CODE | DN | M | 1 | FOR COMM CHANNEL |
| M/S TRANSMIT POWER DESIGNATION | DN | M | 1 | FOR COMM CHANNEL |
| CHANNEL INFORMATION | DN | M | 1 | FOR COMM CHANNEL |

MOBILE COMMUNICATION SYSTEM AND A CONTROL UNIT OF THE SYSTEM FOR EFFICIENT USE OF VACANT CHANNELS IN ONE-WAY COMMUNICATION

BACKGROUND OF THE INVENTION

1. Field of the Invention

The present invention relates to a mobile communication system that carries out digital communication with efficient use of vacant channels in a one-way communication which is performed by separately assigning different channels for the transmission and the receiving. The present invention relates to a method for channel assignment of the mobile communication system. Further, the present related to a control unit for use in the mobile communication system.

2. Description of the Related Art

A mobile communication system that is designed to carry out public service operations, such as fire or police call management operations, by using a multi-channel access (MCA) technique is known. FIG. 20 shows a conventional mobile communication system of this type.

In the conventional mobile communication system of FIG. 20, mobile station units 10, base station units 20, and a central control unit 30 are provided. Each of the mobile station units 10 is formed by mounting a radio communication device on a fire engine or the like. The base station units 20 and the mobile station units 10 communicate with each other by using radio channels. The central control unit 30 controls the radio channels of the base station units 20 and is linked to a core network L.

Generally, in the mobile communication system, a multiple access communication is performed by using the frequency division multiple access (FDMA) method or the time division multiple access (TDMA) method. Alternatively, the code division multiple access (CDMA) method may be used to perform the multiple access communication.

In the above conventional mobile communication system, a two-way communication between the mobile station units 10 is normally performed. In the central control unit 30, upstream and downstream communication channels are assigned to each of the respective mobile station units 10 that perform the two-way communication, in order to achieve the two-way communication between the mobile station units 10. Another type of the one-way communication between the mobile station units 10, which is carried out in the conventional mobile communication system of FIG. 20, is a one-to-multiple one-way communication in which a single transmitter sends information to multiple receivers.

A description will be given of the one-to-multiple one-way communication (hereinafter, called the group communication) between the mobile station units 10 with reference to FIG. 20.

Suppose that, in the mobile communication system of FIG. 20, the FDMA method is used to carry out the group communication. In the FDMA method, the available channel bandwidth is divided into a number of frequency non-overlapping subchannels and a subchannel is assigned to each mobile station unit 10 upon request by the mobile station units 10.

As shown in FIG. 20, the mobile station units 10-1 and 10-2 exist in a radio zone "ZoneA" of the base station unit 20-1, and the mobile station units 10-3 and 10-4 exist in a radio zone "ZoneB" of the base station unit 20-2. In the mobile communication system of FIG. 20, the mobile station units 10-1 through 10-4 pertain to the same group (called group 1) for the group communication.

When a request for the group communication related to the group 1 is transmitted by the mobile station unit 10-1, the central control unit 30 receives the group communication request via the base station unit 20-1. In response to the request, the central control unit 30 retrieves the radio zone in which the mobile station units pertaining to the group 1 exist, by accessing, through the core network, a home location register (HLR) 50 that is connected to the core network. As described above, the mobile station units 10-2, 10-3 and 10-4 pertain to the group 1, the mobile station unit 10-2 exists in the radio zone "ZoneA" of the base station unit 20-1, and the mobile station units 10-3 and 10-4 exist in the radio zone "ZoneB" of the base station unit 20-2.

FIG. 21 shows a channel assignment of the conventional mobile communication system of FIG. 20 in which radio channels are assigned to the mobile stations.

As shown in FIG. 21, in the above case of the group communication request, the central control unit 30 assigns an upstream subchannel f1 (channel1) and a downstream subchannel f2 (channel2) for the radio zone ZoneA of the base station unit 20-1, and assigns an upstream subchannel f3 (channel3) and a downstream subchannel f4 (channel4) for the radio zone ZoneB of the base station unit 20-2. This channel assignment is the same as that in the case of the normal two-way communication.

During the group communication between the mobile station units, the mobile station unit 10-1 transmits an upstream group-communication signal at the frequency f1 to the central control unit 30, whereas the central control unit 30 transmits a downstream group-communication signal at the frequency f2 to the mobile station unit 10-2 and transmits a downstream group-communication signal at the frequency f4 to the mobile station units 10-3 and 10-4. Hence, the one-to-multiple one-way communication between the mobile station units 10 (or the group communication) is carried out by the conventional mobile communication system.

In the TDMA method, the multiple subchannels for multiple access are created by dividing the frame duration into a number N of non-overlapping subintervals, each of individual durations divided by the number N. Then each mobile station unit that requests the group communication is assigned to a particular time slot within each frame. In the CDMA method, each mobile station unit is assigned a unique code sequence that allows the mobile station unit to spread the information signal across the assigned frequency band. Thus, the multiple subchannels for multiple access are created.

However, the conventional mobile communication system assigns the subchannels to the mobile station units in the group communication (the one-way communication) in a manner that is the same as in the normal two-way communication. According to the channel assignment of the conventional mobile communication system, the subchannels that are not used for the group communication are also assigned to the mobile station units. As a result, the efficiency of use of the available frequency channels is lowered.

As described above, the conventional mobile communication system assigns both the upstream subchannel and the downstream subchannel for each base station unit 20 during the group communication. In the channel assignment of FIG. 21, the upstream subchannel f3 is assigned for the base station unit 20-2, but only the downstream subchannel f4 is used to transmit the group-communication signal to the mobile station units 10-3 and 10-4 during the group communication. Therefore, during the group communication of the conventional mobile communication system, the vacant channels (for example, f3) are always provided in the base station units 20 that are different than the base station unit 20 including the mobile station unit 10 transmitting the group communication request and include the mobile station units 10 related to the group specified by the request.

Further, in the conventional mobile communication system of FIG. 20, the mobile station unit 10-2 pertains to the base station unit 20-1 that includes the mobile station unit 10-1 transmitting the group communication request, and is included in the radio zone of the base station unit 20-1. In this case, the downstream subchannel f2 is assigned to the mobile station unit 10-2 in the base station unit 20-1, and the downstream subchannel f2 is used to transmit the group-communication signal to the mobile station unit 10-2. However, there is a case in which the mobile station unit 10 related to the group specified by the group communication request is not included in the radio zone of the base station unit 20-1 including the mobile station unit 10-1 transmitting the group communication request. In the latter case, the downstream subchannel is assigned to that mobile station unit 10, but the downstream subchannel is not used to transmit the group-communication signal to that mobile station unit 10. As a result, the efficiency of use of the available frequency channels is lowered.

SUMMARY OF THE INVENTION

Accordingly, it is an object of the present invention to provide an improved mobile communication system in which the above-described problems are eliminated.

Another object of the present invention is to provide a mobile communication system in which a one-way communication is carried out with efficient use of the vacant channels as in the group communication performed by the conventional mobile communication system.

Another object of the present invention is to provide a method for channel assignment of a mobile communication system in which a one-way communication is carried out with efficient use of the vacant channels as in the group communication performed by the conventional mobile communication system.

Another object of the present invention is to provide a control unit for use in a mobile communication system, which is configured to carry out a one-way communication with efficient use of the vacant channels as in the group communication performed by the conventional mobile communication system.

According to one preferred embodiment of the present invention, a mobile communication system in which pairs of upstream and downstream channels are assigned to mobile station units located in a radio zone of a base station unit to carry out a two-way communication between the mobile station units, and pairs of upstream and downstream channels are assigned to the mobile station units to carry out a one-to-multiple group communication between the mobile station units, includes: a detection unit which detects a vacant communication channel that exists with respect to the group communication carried out in the system; and a channel assignment unit which assigns the vacant communication channel, detected by the detection unit, for a one-way communication different from the group communication.

According to one preferred embodiment of the present invention, a method for channel assignment of a mobile communication system in which pairs of upstream and downstream channels are assigned to mobile station units located in a radio zone of a base station unit to carry out a two-way communication between the mobile station units, and pairs of upstream and downstream channels are assigned to the mobile station units to carry out a one-to-multiple group communication between the mobile station units, includes the steps of: detecting a vacant communication channel that exists with respect to the group communication carried out in the system; and assigning the vacant communication channel, detected in the detecting step, for a one-way communication different from the group communication.

According to one preferred embodiment of the present invention, a mobile communication system in which a central control unit assigns pairs of upstream and downstream channels to mobile station units located in a radio zone of a base station unit to carry out a two-way communication between the mobile station units, and the central control unit assigns pairs of upstream and downstream channels to the mobile station units to carry out a one-to-multiple group communication between the mobile station units, includes: a memory unit which is provided in the central control unit and stores vacant channel data indicative of the presence of a vacant channel with respect to the group communication carried out by the channel assignment of the central control unit; a broadcast message unit which is provided in the base station unit and transmits a broadcast message containing the vacant channel data, stored in the memory unit, to each of the mobile station units; a message receiving unit which is provided in one of the mobile station units and receives the broadcast message transmitted by the broadcast message unit; and a call request transmission unit which is provided in the one of the mobile station units and transmits, when the vacant channel data of the received message indicates the presence of the vacant channel, a call request for a one-way communication using the vacant channel, to the base station unit, wherein the central control unit assigns the vacant channel to the one of the mobile station units in response to a call request for a one-way communication using the vacant channel, which is sent by the one of the mobile station units, and updates the vacant channel data, stored in the memory unit, as a result of the assignment of the vacant channel.

According to one preferred embodiment of the present invention, a mobile communication system in which a central control unit accesses a home location register that manages location information of respective mobile station units, the central control unit assigning pairs of upstream and downstream channels to mobile station units located in a radio zone of a base station unit to carry out a two-way communication between the mobile station units, and the central control unit assigning pairs of upstream and downstream channels to the mobile station units to carry out a one-to-multiple group communication between the mobile station units, the mobile station units in the group communication including a transmitter mobile station unit and a receiver mobile station unit, the mobile communication system includes: a channel control unit which is provided in the central control unit and transmits, when the transmitter mobile station unit is located in the radio zone and the receiver mobile station unit is not located in the radio zone, vacant channel data, indicating that an upstream communication channel corresponding to a downstream communication channel used in the group communication is unused, to a second base station unit of the receiver mobile station, the channel control unit assigning, when a call request for a one-way communication using the upstream communication channel is received from the second base station unit, the upstream communication channel to the receiver mobile station unit; and a call request transmission unit which is provided in the receiver mobile station unit and transmits, when the vacant channel data transmitted by the channel control unit is received, the call request for the one-way communication, to the second base station unit, so that the receiver mobile station unit performs the one-way communication using the upstream communication channel.

According to one preferred embodiment of the present invention, a control unit for a mobile communication system includes: a first unit which assigns pairs of upstream and downstream channels to mobile station units located in a radio zone of a base station unit to carry out a two-way communication between the mobile station units; a second unit which assigns pairs of upstream and downstream channels to the mobile station units located in the radio zone of the base station unit to carry out a one-to-multiple group communication between the mobile station units; a memory unit which stores vacant channel data indicating the presence of a vacant channel with respect to the group communication carried out by the channel assignment of the second unit; a transmission unit which transmits the vacant channel data, stored in the memory unit, to a desired one of the mobile station units via the base station unit; and a vacant channel data unit which assigns the vacant channel to the desired one of the mobile station units in response to a call request for a one-way communication using the vacant channel, which is sent by the desired one of the mobile station units, and the vacant channel data unit updating the vacant channel data, stored in the memory unit, as a result of the assignment of the vacant channel.

According to one preferred embodiment of the present invention, a mobile station unit for use in a mobile communication system, includes: a call setup unit which establishes a call between the mobile station unit and a base station unit having a radio zone where the mobile station unit is located; a control unit which receives, when the mobile station unit is in one of a waiting condition and a receiving condition of a group communication, vacant channel data sent by the base station unit, the vacant channel data indicating the presence of a vacant channel in the group communication, the control unit storing the received channel data into a memory area of the mobile station unit, and determining whether the vacant channel exists, based on the stored channel data; and a transmission unit which transmits, when the control unit determines that the vacant channel exists, a call request for a one-way communication using the vacant channel to a central control unit via the base station unit.

In the mobile communication system of the above preferred embodiments, the base station unit transmits a broadcast message to each mobile station unit by using the downstream control channel or the downstream communication channel, and the mobile station unit can independently determine whether the vacant channel exists, and can transmit, if it exists, a call request for a one-way communication, which uses the vacant channel, to the base station unit. The call request, transmitted by the mobile station unit, is delivered to the central control unit via the base station unit. In response to the call request, the central control unit or the base station unit determines whether the vacant channel actually exists in the radio zone of the base station unit where the mobile station unit originating the call request is located. When the vacant channel exits, the central control unit assigns the vacant channel to the mobile station unit originating the call request. Then the central control unit transmits a result of the channel assignment concerning the mobile station unit to the base station unit.

Accordingly, the mobile communication system of the above preferred embodiments is effective in providing efficient use of the available frequency channels. It is not necessary to perform a preliminary communication in order to ensure the channel needed for the mobile station unit to perform a one-way communication. The mobile communication system of the above preferred embodiments can carry out a one-way communication with efficient use of the vacant channels as in the group communication performed by the conventional mobile communication system.

BRIEF DESCRIPTION OF THE DRAWINGS

Other objects, features and advantages of the present invention will become apparent from the following detailed description when read in conjunction with the accompanying drawings.

FIG. 5A and FIG. 5B are diagrams for explaining channel formats of common access channel of an upstream control channel and a downstream control channel.

FIG. 6A and FIG. 6B are diagrams for explaining channel formats of user specific channel of an upstream communication channel and a downstream communication channel.

FIG. 9 is a flowchart for explaining a vacant channel data deleting procedure executed by the communication state monitor portion.

FIG. 10 is a diagram for explaining a broadcast message of the communication state information sent by a broadcast message portion of the base station unit.

FIG. 15 is a diagram for explaining collision control information sent by the base station unit.

FIG. 16 is a diagram for explaining a transmission radio condition message sent by the mobile station unit.

FIG. 18 is a diagram for explaining an access allowance message sent by the base station unit.

DETAILED DESCRIPTION OF PREFERRED EMBODIMENTS

A description will now be provided of the preferred embodiments of the present invention with reference to the accompanying drawings.

Figure 1:
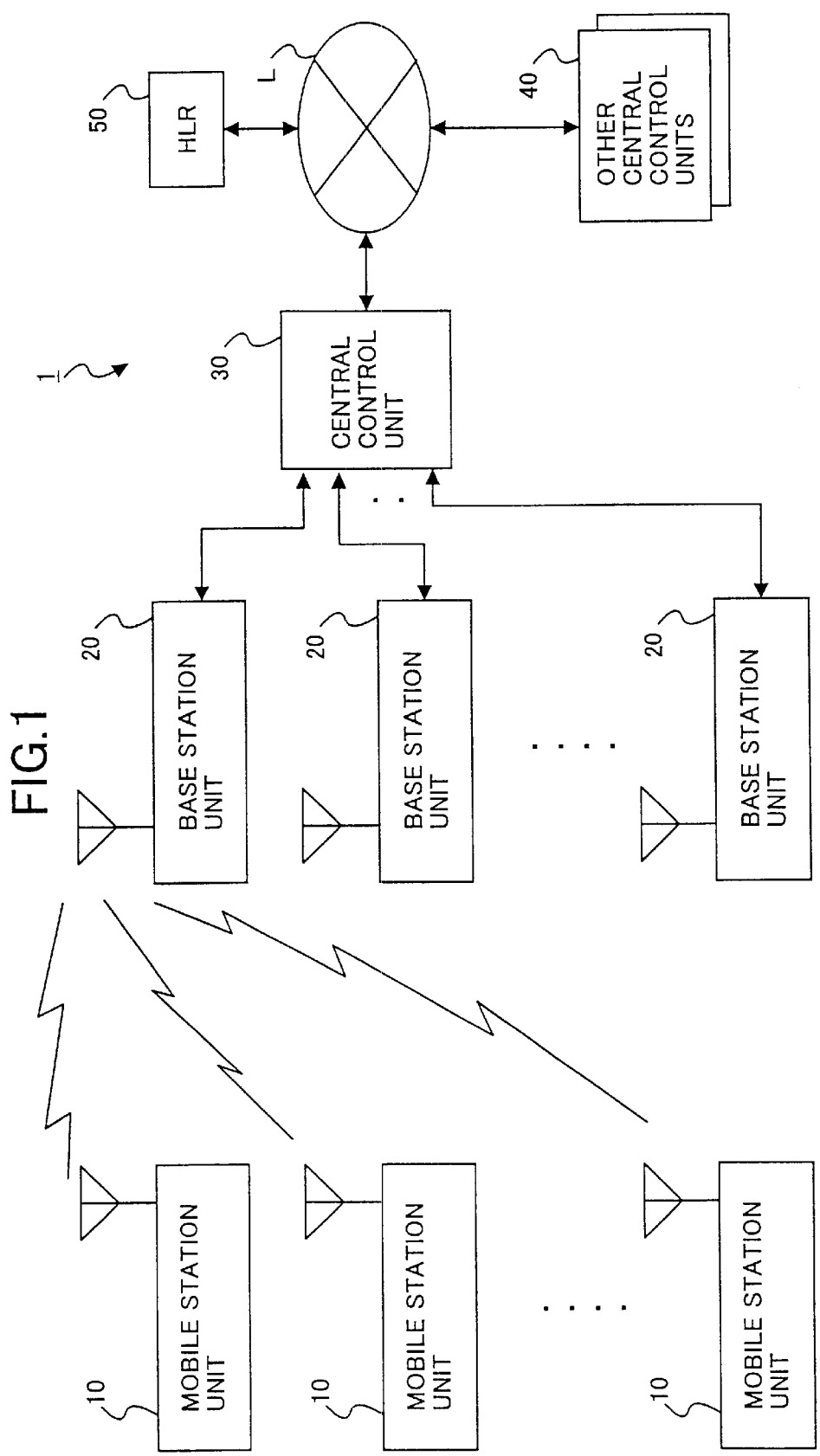
FIG. 1 is a block diagram of a mobile communication system to which one preferred embodiment of the invention is applied.

FIG. 1 shows a configuration of the mobile communication system to which one preferred embodiment of the invention is applied.

As shown in FIG. 1, in the mobile communication system 1, mobile station units 10, base station units 20, and a central control unit 3 are provided. Each of the mobile station units 10 performs a one-way communication by using specific radio channels. Each of the base station units 20 establishes a call between the base station unit 20 and each mobile station unit 10 existing in the radio zone covered by the base station unit 20, and passes on a communication signal from one of the base station units 10 to another during the one-way communication. The central control unit 30 controls the base station units 20 that are linked to the central control unit 30.

The central control unit 30 is linked to other central control units 40 via a core network L. The central control unit 30 is capable of accessing a home location register (HLR) 50 through the core network L. In the home location register (HLR) 50, location information of the respective mobile station units 10 is managed and accessed by the central control unit 30 through the core network L.

In the mobile communication system 1, a two-way communication between the mobile station units 10 is normally performed. In the central control unit 30, upstream and downstream communication channels are assigned to each of the respective mobile station units 10 that perform the two-way communication. In addition, another type of the one-way communication between the mobile station units 10, which is carried out in the above-described mobile communication system 1, is the one-to-multiple one-way communication (or the group communication) in which a single transmitter sends information to multiple receivers.

Figure 2:
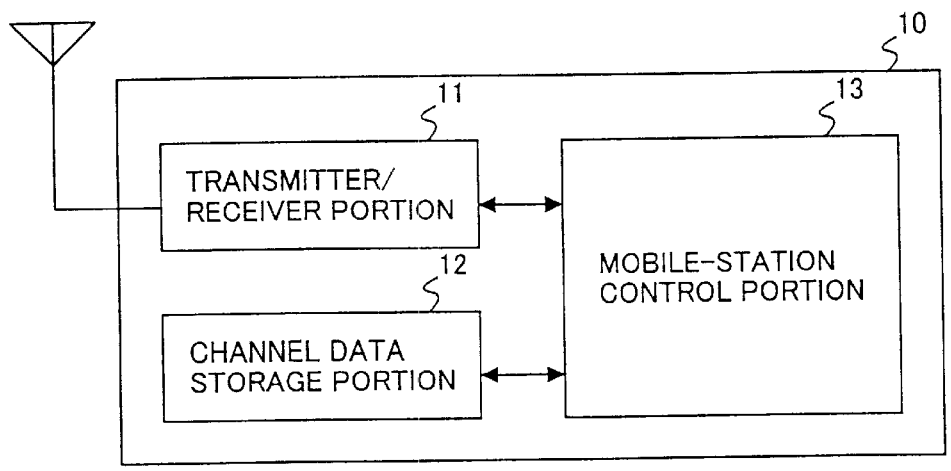
FIG. 2 is a block diagram of a mobile station unit in the mobile communication system of the present embodiment.

The mobile station units 10 are constituted by either radio communication devices mounted on vehicles or portable radio communication devices carried by the users. FIG. 2 shows a configuration of one of the mobile station units 10 in the mobile communication system of FIG. 1. As shown in FIG. 2, the mobile station unit 10 generally includes a transmitter/receiver portion 11, a channel data storage portion 12, and a mobile-station control portion 13. The transmitter/receiver portion 11 performs a radio communication with the base station unit 20. The channel data storage portion 12 includes a memory area in which communication state information, received from the base station unit 20, is temporarily stored. The mobile-station control portion 13 determines whether the vacant channel exists, based on the communication state information stored in the channel data storage portion 12. When the vacant channel exists, the mobile-station control portion 13 transmits a call request to the base station unit 20.

Figure 3:
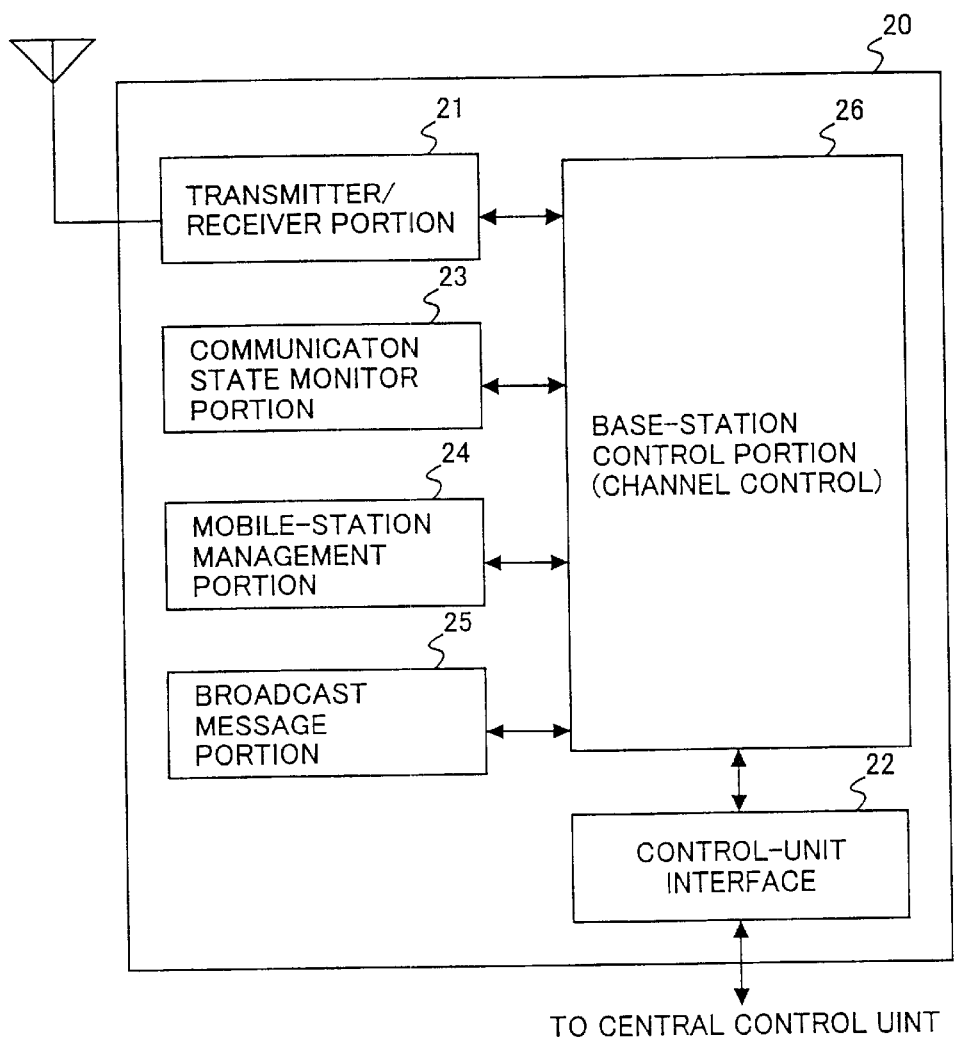
FIG. 3 is a block diagram of a base station unit in the mobile communication system of the present embodiment.

FIG. 3 shows a configuration of one of the base station units 20 in the mobile communication system of FIG. 1. The base station unit 20 serves to pass on a communication signal from one of the base station units 10 to another during the one-way communication. As shown in FIG. 3, the base station unit 20 generally includes a transmitter/receiver portion 21, a control-unit interface 22, a communication state monitor portion 23, a mobile-station management portion 24, a broadcast message portion 25, and a base-station control portion 26.

In the base station unit 20 of FIG. 3, the transmitter/receiver portion 21 performs a radio communication with the mobile station units 10. The control-unit interface 22 provides an interface of the base station unit 20 to the central control unit 30. The communication state monitor portion 23 monitors the state of radio channel assignment and the up/down direction code based on the contents of a control channel (which will be described later), and generates a communication state signal based on the results of the monitoring. The communication state signal, generated by the communication state monitor portion 23, is indicative of whether the vacant channel that can be assigned to the mobile station unit 10 exists among the radio channels of the base station unit 20. The mobile-station management portion 24 manages the respective mobile station units 10 that exist in the radio zone covered by the base station unit 20. The broadcast message portion 25 transmits a broadcast message containing the communication state information to each mobile station unit 10 that exist in the radio zone covered by the base station unit 20. Upon request by one of the mobile station units 10 in response to the message sent by the broadcast message portion 25, the base-station control portion 26 controls the channel assignment such that the vacant channel is assigned to the one of the mobile station units 10.

In the base station unit 20 of FIG. 3, the functions of the respective portions 23 through 26 are achieved by executing program code instructions stored in a computer readable storage medium in the base station unit 20.

Figure 4:
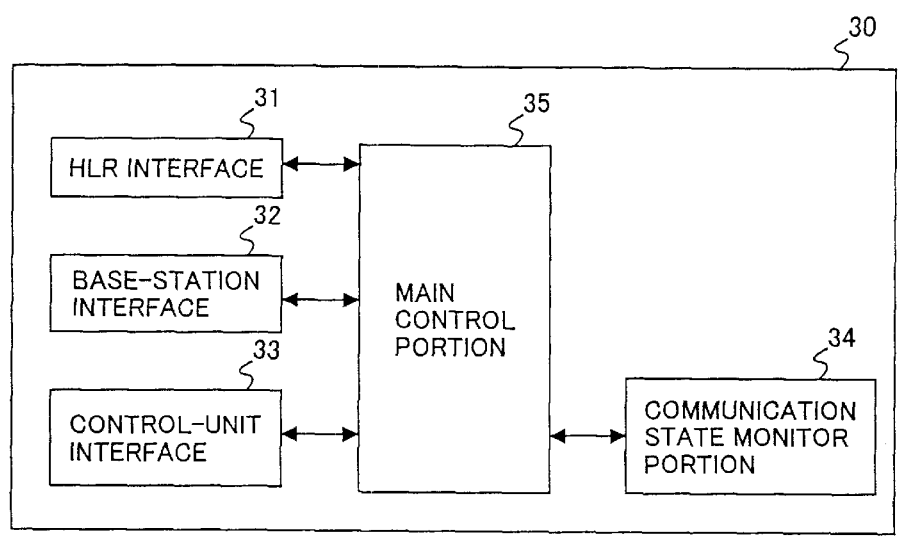
FIG. 4 is a block diagram of a central control unit in the mobile communication system of the present embodiment.

FIG. 4 shows a configuration of the central control unit 30 in the mobile communication system of FIG. 1. As shown in FIG. 4, the central control unit 30 generally includes an HLR (home location register) interface 31, a base-station interface 32, a control-unit interface 33, a communication state monitor portion 34, and a main control portion 35. The HLR interface 31 provides an interface of the central control unit 30 to the HLR 50. The base-station interface 32 provides an interface of the central control unit 30 to the base station units 20. The control-unit interface 33 provides an interface of the central control unit 30 to the other central control units 40. The communication state monitor portion 34 monitors the state of radio channel assignment for each of the respective base station units 20. The main control portion 35 has a primary function to detect the available communication channels based on the current communication state information, so that the channel assignment for the base station units 20 is controlled.

In the actual configuration of the mobile communication system 1, there are various variations of the mobile station units 10, the base station units 20 and the central control unit 30 in combination. The mobile communication system 1 of the present embodiment is a typical example of a large-scale mobile communication system when it is demanded. When a small-scale mobile communication system is demanded, the functions of the central control unit 30 may be incorporated into one of the base station units 20. When a middle-scale mobile communication system is demanded, the interconnection between the central control unit 30 and the other central control units 40 via the core network L may be eliminated.

In the mobile communication system of the present embodiment, a digital communication between the mobile station unit 10 and the base station unit 20 is carried out by using π/4-shift QPSK (quadrature phase shift keying) method with the carrier frequencies of 400 MHz band. The channel assignment of the downstream channels is based on TDM (time division multiplexing) method, and the channel assignment of the upstream channels is based on TDMA (time division multiple access) method. The radio channels used in the digital communication of the above type are categorized into the control channel and the communication channel, which depends on the kind of the time slots contained in the radio channel. The control channel is a radio channel containing commonly assigned time slots, whereas the communication channel is a radio channel containing individually assigned time slots.

A detailed description of the functions of each of the control channel and the communication channel is given by a known industrial standard RCR-Standard-39. When the π/4-shift QPSK method is used, the control channel including the commonly assigned time slots is called CAC (common access channel), and the communication channel including the individually assigned time slots is called USC (user specific channel).

A description will now be provided of each of the common access channel CAC and the user specific channel USC.

The common access channel CAC is the control channel that is commonly used by the users for message broadcasting and call establishment. The CAC comprises BCCH (broadcast control channel), CCCH (common control channel), and UPCH (user packet control channel). The BCCH is a downstream channel that is used for the base station unit 20 to deliver the call establishment control information to the mobile station unit 10. The control information delivered with the BCCH includes a message kind, a network identifier data octet number, a network identifier, various restriction data, a control channel structure code, a mobile station transmit power designation, a receiving allowance level, a receiving degradation level, the number of neighboring-zone check perch channels, a perch channel number, a location registration timer, an extended data element length (0 through 127 bits), an extended data element (the user's option), an upstream/downstream direction, and a mandatory/option kind code. In the present embodiment, the communication state information is transmitted by using the extended data element of the control information for the BCCH.

The common control channel CCCH is a one-to-multiple two-way control channel that is used to deliver the control information needed for call establishment. In order to allow the mobile station unit 10 to perform intermittent receiving operations, PCH (paging channel) and SCCH (signal control channel) are provided. The PCH is a one-way control channel that is used by the base station unit 20 to perform a broadcast calling to the mobile station units 10. The SCCH is a two-way control channel that is used to deliver the specific-zone signaling control information between the base station unit 20 and the mobile station unit 10.

The user packet control channel UPCH is a one-to-multiple two-way control channel that is used to deliver the system related control data between the base station unit 20 and the mobile station units 10.

The user specific channel USC is a two-way communication channel that is specifically used by each user to deliver the user information between the mobile station units 10 through the base station unit 20. The USC comprises TCH (traffic channel) and ACCH (associated control channel). The TCH is a two-way communication channel that is used to deliver the user information between the mobile station units 10. The ACCH is a control channel used to deliver the traffic associated control information between the base station unit 20 and the mobile station unit 10. The ACCH comprises FACCH (fast associated control channel) and SACCH (slow associated control channel). The FACCH is used to perform a high-speed data transmission of the traffic associated control information by temporarily stealing the traffic channel or the user packet channel. The SACCH is used to perform a low-speed data transmission of the traffic associated control information. In the present embodiment, the communication state information is transmitted by using the FACCH and the SACCH.

FIG. 5A shows the channel format of the common access channel CAC of an upstream control channel that is used to transmit the control information from the mobile station units to the base station unit 20.

FIG. 5B shows the channel format of the common access channel CAC of a downstream control channel that is used to transmit the control information from the base station unit 20 to the mobile station unit 10.

In FIG. 5A and FIG. 5B, "LP" denotes a linearizer preamble (36 bits), "R" denotes a guard time for burst transitory response (6 bits), "P" denotes a preamble (56 bits), "SW" denotes a sync word (20 bits), "I" denotes an idle code (2 bits) indicative of the presence of an idle condition, "CC" denotes a color code (6 bits) indicative of the occurrence of an interference, and "G" denotes a guard time (24 bits) for confirming the distance between the devices. The "CAC", included in the channel formats of FIG. 5A and FIG. 5B, denotes a control channel (56 through 112 bits) in a narrow sense, which is inclusive of the PCH, BCCH and UPCH channels. In FIG. 5A and FIG. 5B, "CI" denotes a control channel communication indicator (2 bits). "E", which is affixed to the CAC of the downstream control channel, denotes collision control information, which will be described later.

FIG. 6A shows the channel format of the user specific channel USC of an upstream communication channel. FIG. 6B shows the channel format of the user specific channel USC of a downstream communication channel. In FIG. 6A and FIG. 6B, "R" denotes a guard time for burst transitory response (6 bits), "P" denotes a preamble (2 bits), "TCH" denotes the traffic channel (108 through 148 bits) which is the same as the FACCH described above, "SW" denotes a sync word (20 bits), "I" denotes an idle code (2 bits) which is indicative of the presence of an idle condition, "CC" denotes a color code (6 bits) which is indicative of the occurrence of an interference, "SACCH" denotes the slow associated control channel described above (20 bits), and "G" denotes a guard time (8 bits) for confirming the distance between the devices. The "B/I", included in the downstream USC channel format of FIG. 6B, denotes a busy/idle code (8 bits), which is indicative of whether the base station unit 20 is in a busy condition (the communication is impossible) or in an idle condition (the communication is possible).

Next, a description will be provided of the operation of the mobile communication system of the present embodiment when performing the one-to-multiple one-way communication (or the group communication).

In the mobile communication system of the present embodiment, the base station unit 20 monitors the state of the radio channel assignment in the radio zone covered by the base station unit 20 itself, whereas the central control unit 30 monitors the state of the radio channel assignment for each of the respective base station units 20 linked to the central control unit 30.

Figure 7:
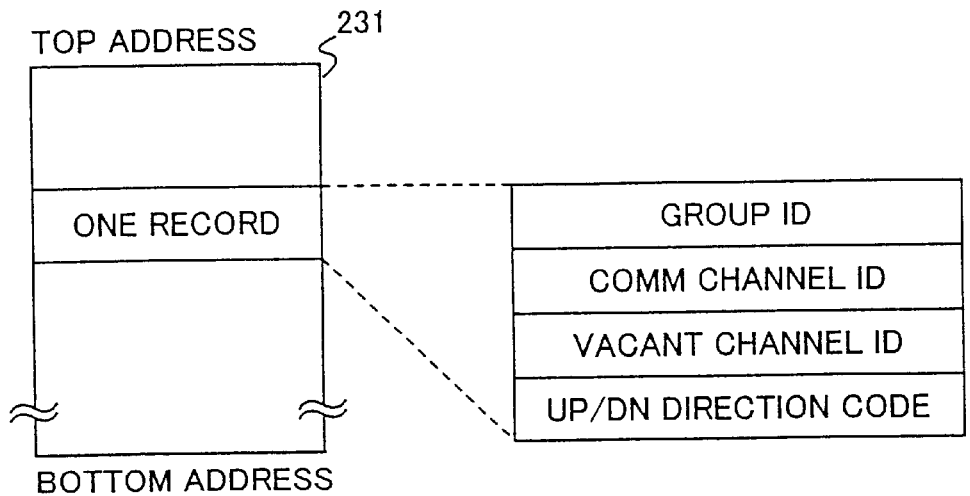
FIG. 7 is a diagram for explaining the contents of a channel management memory in a communication state monitor portion of the base station unit.

The communication state monitor portion 23 of the base station unit 20 includes a channel management memory 231. FIG. 7 shows the contents of the channel management memory 231 in the communication state monitor portion 23 of the base station unit 20. The communication state monitor portion 23 stores vacant channel data, which is generated as a result of the monitoring each time the group communication is performed, into a one-record area of the channel management memory 231.

As shown in FIG. 7, each record of the vacant channel data stored in the channel management memory 231 includes a group ID, a communication channel ID, a vacant channel ID, and an upstream/downstream direction code. The group ID identifies a particular group of the mobile station units 10 when the group communication is performed. The communication channel ID identifies a particular communication channel that is correlated to the carrier frequency used in the group communication. The vacant channel ID identifies a particular vacant channel that is correlated to the frequency of the channel available in the group communication. The upstream/downstream direction code indicates whether the direction of the group communication is upstream (UP) or downstream (DN).

Figure 8:
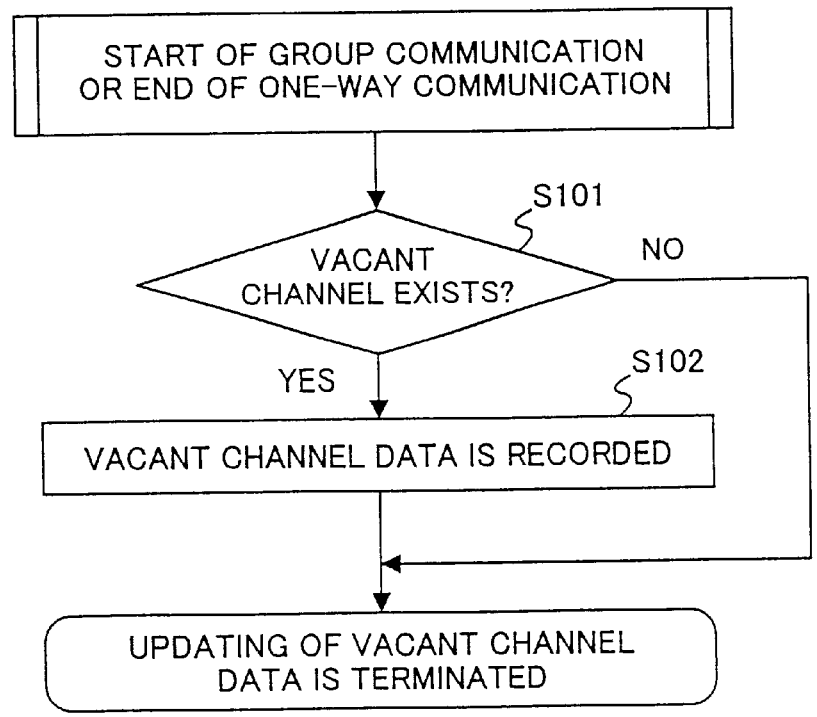
FIG. 8 is a flowchart for explaining a vacant channel data recording procedure executed by the communication state monitor portion.

FIG. 8 shows a vacant channel data recording procedure executed by the communication state monitor portion 23 of the base station unit 20.

As shown in FIG. 8, the vacant channel data recording procedure is started by the communication state monitor portion 23 at the time of a start of the group communication or at the time of an end of the one-way communication that is performed by using the vacant channel in the group communication. At a start of the vacant channel data recording procedure, the communication state monitor portion 23 determines whether the vacant channel exists, based on the result of the monitoring of the radio channel assignment (S101). When the vacant channel exists, the communication state monitor portion 23 generates a vacant channel data including the group ID, the communication channel ID, the vacant channel ID and the upstream/downstream direction, and stores the vacant channel data into the channel management memory 231 (S102). After the step S102 is performed, the vacant channel data recording procedure is terminated.

On the other hand, when the vacant channel does not exist, the step S102 is not performed and the vacant channel data recording procedure is terminated. Accordingly, the contents of the channel management memory 231 are updated by the communication state monitor portion 23 each time the group communication is performed.

FIG. 9 shows a vacant channel data deleting procedure executed by the communication state monitor portion 23 of the base station unit 20.

As shown in FIG. 9, the vacant channel data deleting procedure is started by the communication state monitor portion 23 at the time of an end of the group communication or at the time of a start of the one-way communication in which the vacant channel is assigned based on the vacant channel data in the group communication. At a start of the vacant channel data deleting procedure, the communication state monitor portion 23 deletes the vacant channel data, which has been recorded in the channel management memory 231 in the group communication (S201). After the step S201 is performed, the vacant channel data deleting procedure is terminated. Accordingly, the contents of the channel management memory 231 are updated by the communication state monitor portion 23 each time the group communication is performed.

In the central control unit 30 of the above-described embodiment, the communication state monitor portion 34 includes a channel management memory that is similar to the channel management memory 231 of the base station unit 20. Each record of the vacant channel data stored in this channel management memory of the monitor portion 34 contains a base station unit ID of a particular one of the respective base station units 20 in addition to the data elements of the channel management memory 231 of each base station unit 20.

Alternatively, the management of the vacant channels may be performed such that the vacant channel that will be used in a one-way communication is set in a busy state at a start of the one-way communication, and it is set in an idle state at an end of the one-way communication for use in a following one-way communication.

In the base station unit 20 of the above-described embodiment, the broadcast message portion 25 transmits a broadcast message containing the communication state information to all of the mobile station units 10 that exist in the radio zone covered by the base station unit 20. When the broadcast message is transmitted to the base station units 10 that are in a receiving condition of the group communication, the SACCH or the FACCH of the downstream communication channel is used to deliver the communication state information. When the broadcast message is transmitted to the other base station units 10 that are not in a receiving condition of the group communication, the extended data element (the user's option) provided at the end of the BCCH of the downstream control channel is used to deliver the communication state information. Accordingly, the mobile communication system of the above-described embodiment can easily carry out the one-way communication with efficient use of the vacant channels that are not used in the normal group communication, while satisfying the requirements of the existing channel formats.

FIG. 10 shows a broadcast message of the communication state information sent by the broadcast message portion 25 of the base station unit 20.

As shown in FIG. 10, the broadcast message of the communication state information includes a message kind, the number of vacant channels, and subsequent data elements (group number, carrier frequency number, and channel number), and each of these data elements includes the upstream/downstream (UP/DN) direction, the mandatory/option (M/O) kind, and the data length. The message kind of the message indicates whether the vacant channel data is included in the message. When "n" is equal to 0, the subsequent data elements (group number, carrier frequency number, channel number) are not included in the message and it is adequate for the message to include an indication that no vacant channel exits. When "n" is not equal to 0, the subsequent data elements (group number, carrier frequency number, channel number) corresponding to the respective vacant channels are included in the message. It is desirable that the message contains detailed information of the vacant channels on both the upstream channel and the downstream channel.

Figure 11:
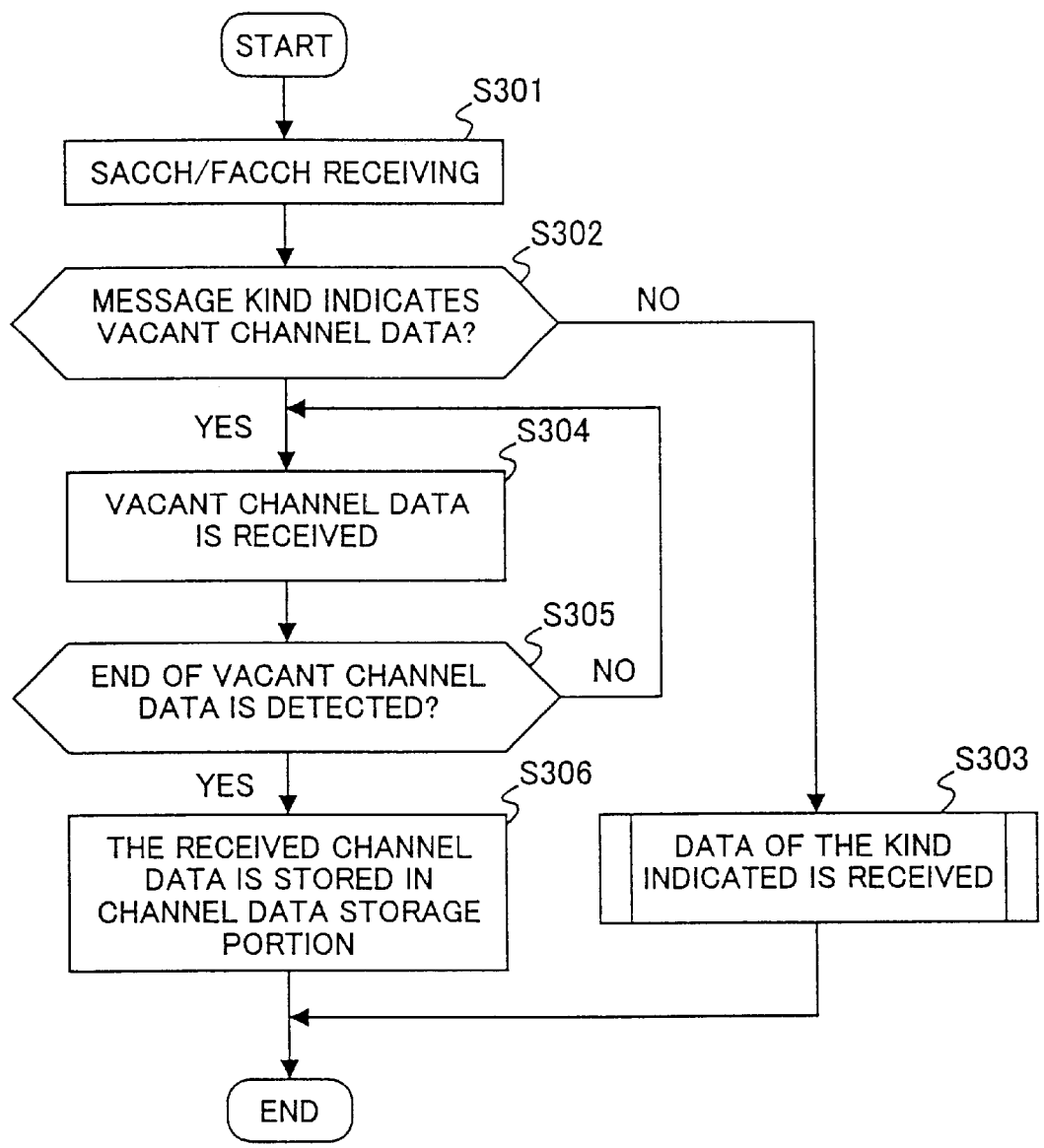
FIG. 11 is a flowchart for explaining a communication state information receiving procedure executed by the mobile station unit.

FIG. 11 shows a communication state information receiving procedure executed by the mobile station unit 10 that is in a receiving condition of the group communication.

As shown in FIG. 11, at a start of the communication state information receiving procedure, the mobile station unit 10 receives a broadcast message of the communication state information from the SACCH or the FACCH of the downstream communication channel (S301). After the step S301 is performed, the mobile station unit 10 determines whether the message kind, included in the received message, indicates the presence of the vacant channel data (S302).

When the result at the step S302 is negative, the mobile station unit 10 receives the data of the kind indicated by the message kind (S303). After the step S303 is performed, the communication state information receiving procedure of FIG. 11 is terminated.

When the result at the step S302 is affirmative, the mobile station unit 10 receives the vacant channel data (S304). It is adequate for the vacant channel data received at step S304 to indicate the presence of the vacant channel. After the step S304 is performed, the mobile station unit 10 determines whether an end of the vacant channel data in the message is detected (S305). When the result at the step S305 is negative, the step S304 is repeated until the end of the vacant channel data is detected.

When the result at the step S305 is affirmative, the mobile station unit 10 stores the received vacant channel data into the channel data storage portion 12 (S306). After the step S306 is performed, the communication state information receiving procedure of FIG. 11 is terminated.

During the period that the vacant channel data is received and stored into the channel data storage portion 12, the normal group communication receiving procedure is performed at the mobile station unit 10 in parallel. In the receiving procedure of FIG. 11, the mobile station unit 10 receives the broadcast message of the communication state information from the SACCH or the FACCH of the downstream communication channel. The normal group communication operation of the mobile station unit 10 is not affected by the receiving procedure of FIG. 11, and the mobile station unit 10 can receive the communication state information from the base station unit 20 and store it into the channel data storage portion 12. Accordingly, when the necessity to perform the one-way communication occurs, the mobile station unit 10 can independently determine whether the vacant channel exists, and can immediately transmit, if it exists, a call request to the base station unit 20.

Figure 12:
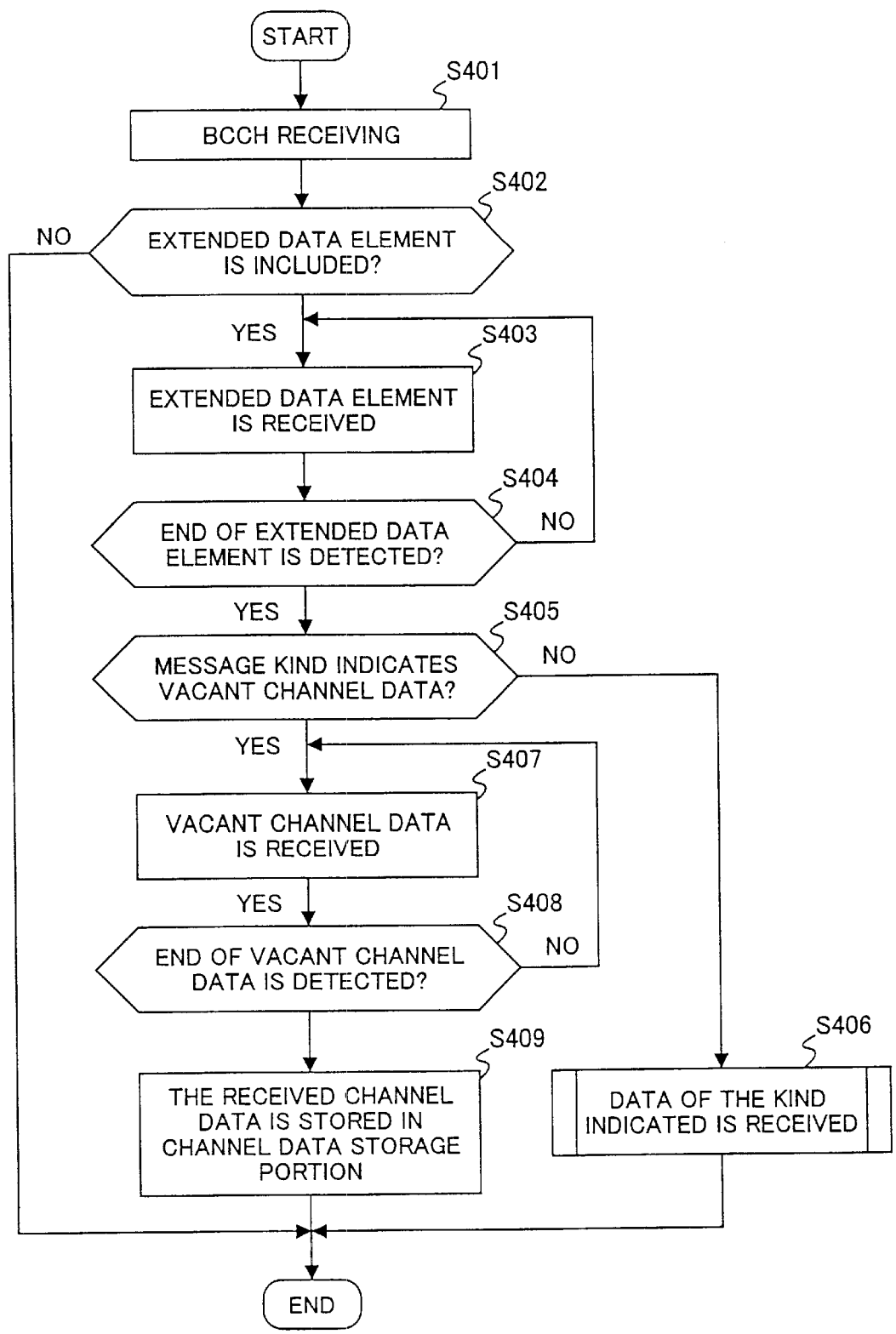
FIG. 12 is a flowchart for explaining a communication state information receiving procedure executed by the mobile station unit.

FIG. 12 shows a communication state information receiving procedure executed by the mobile station unit 10 that is in a waiting condition before a start of the group communication (not in a receiving condition thereof).

As shown in FIG. 12, at a start of the communication state information receiving procedure, the mobile station unit 10 receives a broadcast message of the communication state information from the BCCH of the downstream control channel (S401). After the step S401 is performed, the mobile station unit 10 determines whether the extended data element is included in the received message (S402). When the result at the step S402 is negative, the procedure of FIG. 12 is terminated. When the result at the step S402 is affirmative, the mobile station unit 10 receives the extended data element (S403). The mobile station unit 10 determines whether an end of the extended data element in the message is detected (S404). When the result at the step S404 is negative, the step S403 is repeated until the end of the extended data element is detected.

When the result at the step S404 is affirmative, the mobile station unit 10 receives all the extended data element in the message. The mobile station unit 10 determines whether the message kind, included in the received message, indicates the presence of the vacant channel data (S405).

When the result at the step S405 is negative, the mobile station unit 10 receives the data of the kind indicated by the message kind (S406). After the step S406 is performed, the communication state information receiving procedure of FIG. 12 is terminated.

When the result at the step S405 is affirmative, the mobile station unit 10 receives the vacant channel data (S407). After the step S407 is performed, the mobile station unit 10 determines whether an end of the vacant channel data in the message is detected (S408). When the result at the step S408 is negative, the step S407 is repeated until the end of the vacant channel data is detected.

When the result at the step S408 is affirmative, the mobile station unit 10 stores the received vacant channel data into the channel data storage portion 12 (S409). After the step S409 is performed, the communication state information receiving procedure of FIG. 12 is terminated.

During the period that the vacant channel data is received and stored into the channel data storage portion 12, the mobile station unit 10 is operating in a waiting condition for the normal group communication. In the receiving procedure of FIG. 12, the mobile station unit 10 receives the broadcast message of the communication state information from the BCCH of the downstream control channel. The waiting operation of the mobile station unit 10 is not affected by the receiving procedure of FIG. 12, and the mobile station unit 10 can receive the communication state information from the base station unit 20 and store it into the channel data storage portion 12. Accordingly, when the necessity to perform the one-way communication occurs, the mobile station unit 10 can independently determine whether the vacant channel exists, and can transmit, if it exists, a call request for a one-way communication, which uses the vacant channel, to the base station unit 20.

Figure 13:
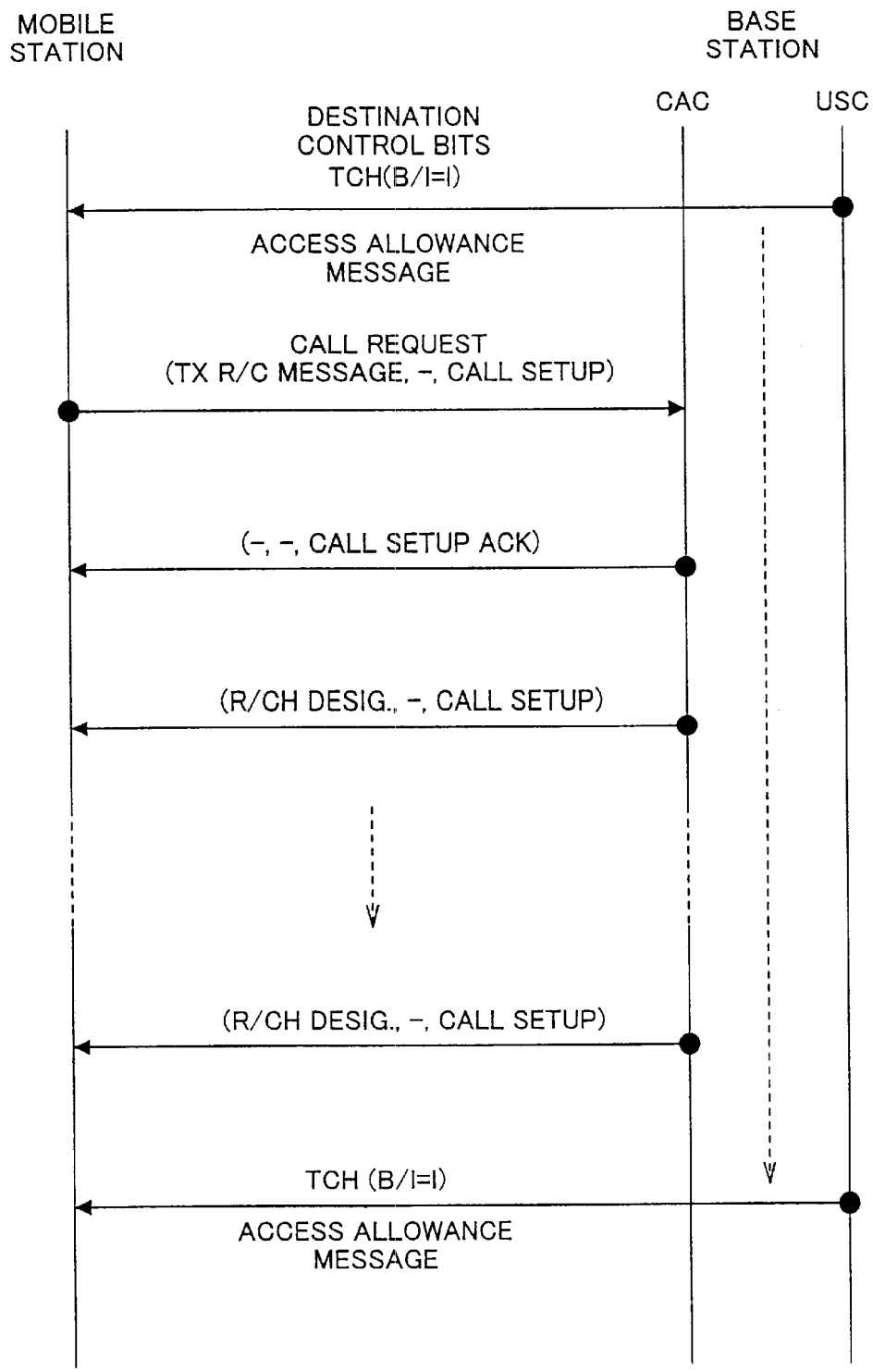
FIG. 13 is a diagram for explaining a call request processing sequence performed by the mobile station unit to the base station unit.

In the mobile communication system of the present embodiment, the mobile station unit 10 transmits, after the communication state information is stored in the channel data storage portion 12 of the mobile station unit 10, a call request for an upstream one-way communication to the base station unit 20. When transmitting the call request, the mobile station unit 10 uses the upstream communication channel related to the radio zone where the mobile station unit 10 exists. The channel format of the user specific channel USC of the upstream communication channel is shown in FIG. 6A. A call request processing sequence that is performed in the above case by the mobile station unit 10 to the base station unit 20 is shown in FIG. 13. In the present embodiment, the call request processing is started when a given key operation is manually performed by the user on the mobile station unit 10. Alternatively, the call request processing may be automatically started.

Figure 14:
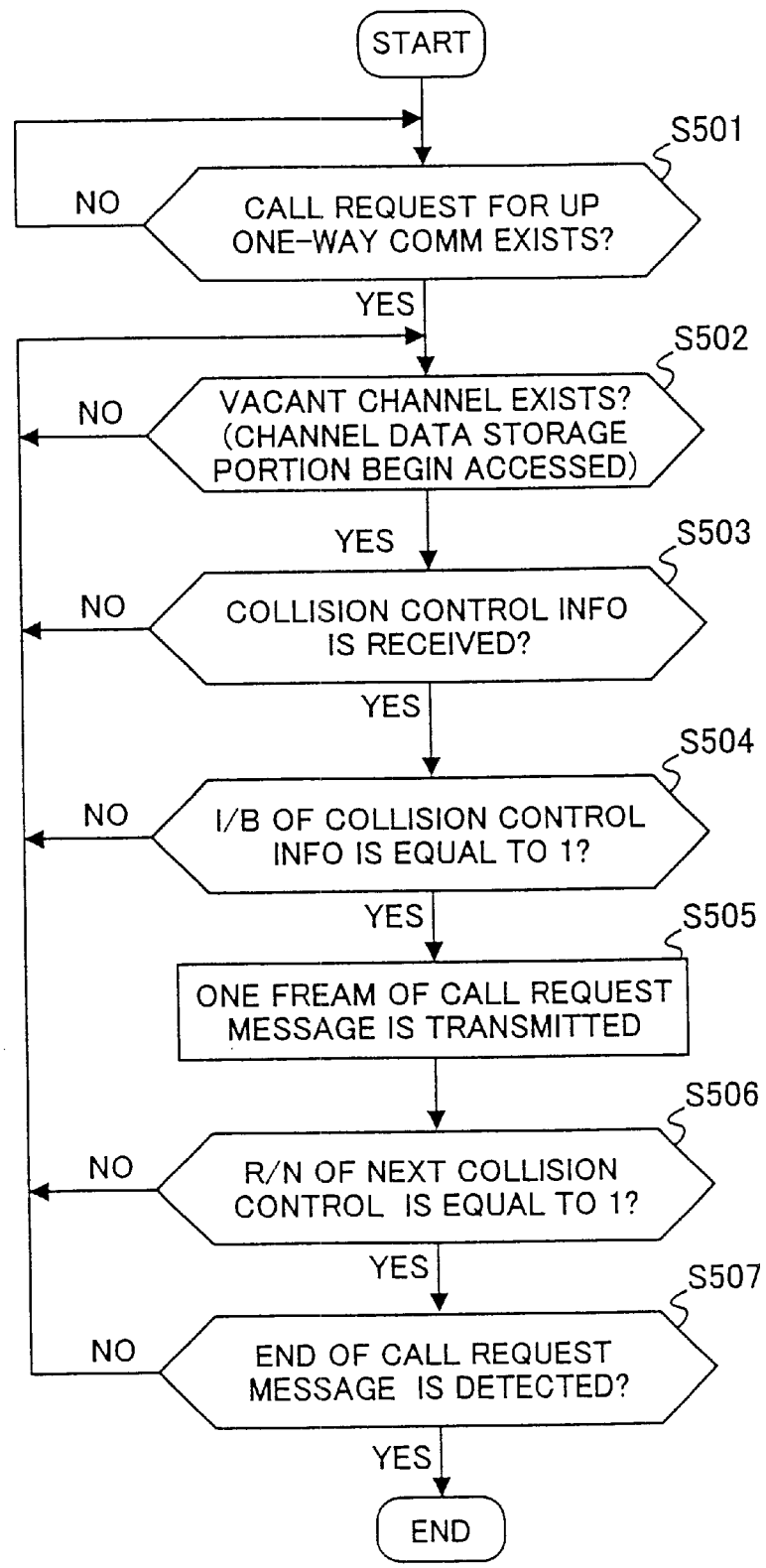
FIG. 14 is a flowchart for explaining a call request message transmission procedure executed by the mobile station unit.

FIG. 14 shows a call request message transmission procedure executed by the mobile station unit 10 in the above case. Suppose that, in the procedure of FIG. 14, an access allowance message is transmitted to the mobile station unit 10 by the base station unit 20 as shown in FIG. 13.

As shown in FIG. 14, the mobile station unit 10 determines whether a call request for an upstream one-way communication exists (S501). The step S501 is repeated until the result at the step S501 is affirmative. The mobile station unit 10 determines whether the vacant channel exists, based on the communication state information stored in the channel data storage portion 12 (S502). It is adequate for the vacant channel data in the received message to indicate the presence of the channel data, regardless of whether it relates to the upstream channel or the downstream channel. The step S502 is repeated until the result at the step S502 is affirmative.

When the result at the step S502 is affirmative, the mobile station unit 10 determines whether the collision control information, sent by the base station unit 20, is received (S503).

In the mobile communication system of the present embodiment, the base station unit 20 transmits collision control information to the mobile station unit 10 by using the CAC of the downstream control channel. FIG. 15 shows the collision control information sent by the base station unit 20. As shown in FIG. 15, the collision control information includes an idle/busy code I/B, a received/not-received code R/N, and a cyclic redundancy check code PE. The I/B is indicative of whether the base station unit 20 is in a busy condition (the transmission of a message to the base station unit 20 is inhibited) or in an idle condition (the transmission of a message to the base station unit 20 is allowed). When the I/B is set to 1, it indicates the idle condition of the base station unit 20 (I/B=1), and, when the I/B is set to 0, it indicates the busy condition of the base station unit 20 (I/B=0). The R/N is indicative of whether the base station unit 20 is in a receiving condition or not. When the R/N is set to 1, it indicates that the base station unit 20 is in the receiving condition, or the receiving is possible (R/N=1), and, when the R/N is set to 0, it indicates that the base station unit 20 is not in the receiving condition, or the receiving is impossible (R/N=0). The PE is a 16-bit cyclic redundancy check code for the CAC of the downstream control channel.

In the procedure of FIG. 14, when the result at the step S503 is negative, the control of the mobile station unit 10 is transferred to the above step S502. When the result at the step S503 is affirmative, the mobile station unit 10 determines whether the idle/busy code I/B of the collision control information received is equal to 1 (S504). When the result at the step S504 is negative (I/B=0), the control of the mobile station unit 10 is transferred to the above step S502. When the result at the step S504 is affirmative (I/B=1), the mobile station unit 10 transmits a frame of the call request message to the base station unit 10 (S505).

After the step S505 is performed, the mobile station unit 10 determines whether the R/N of a following collision control information that is received from the base station unit 20 after one frame is transmitted from the mobile station unit 10 to the base station unit 20 is equal to 1 (S506). In the step S506, the mobile station unit 10 further determines whether the PE of the following collision control information is correct. When the result at the step S506 is negative, the control of the mobile station unit 10 is transferred to the above step S502. When the result at the step S506 is affirmative, the mobile station unit 10 determines whether an end of the call request message is detected (S507).

When the result at the step S507 is negative, the control of the mobile station unit 10 is transferred to the above step S502. When the result at the step S507 is affirmative, the call request message transmission procedure of FIG. 14 is terminated.

In the procedure of FIG. 14, when the R/N is equal to 0, the mobile station unit 10 performs a retransmission of the call request message to the base station unit 20 in accordance with the I/B of the collision control information. The mobile station unit 10 transmits the call request message (including the transmission radio condition message and the transmission call setup) to the base station unit 20 by using the SCCH of the upstream control channel CAC.

FIG. 16 shows a transmission radio condition message that is transmitted to the base station unit 20 by the mobile station unit 10. As shown in FIG. 16, the transmission radio condition message includes a message kind, a mobile-station kind, and a receiving level, and each of these data elements includes the upstream/downstream (UP/DN) direction, the mandatory/option (M/Q) kind, the data length, and others.

Figure 17:
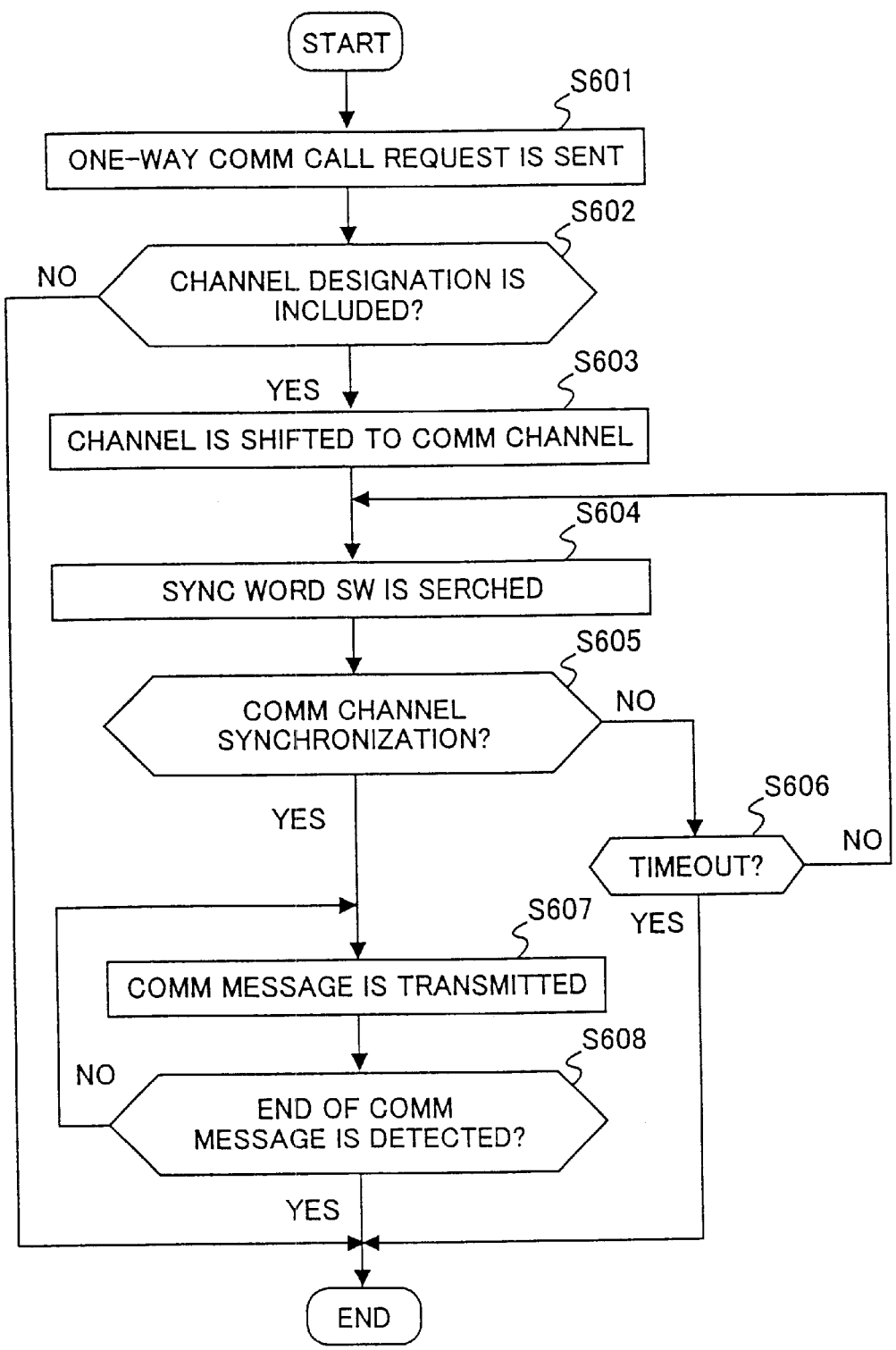
FIG. 17 is a flowchart for explaining a transmission procedure executed by the mobile station unit.

FIG. 17 shows a transmission procedure executed by the mobile station unit 10 from a start of the call request message transmission (the upstream one-way communication) to an end of the call request message transmission.

Suppose that, in the procedure of FIG. 17, the mobile station unit 10 already receives the vacant channel data on the group communication before transmitting a call request for an upstream one-way communication, and already recognizes the vacant channel of the upstream one-way communication channel based on the received vacant channel data.

As shown in FIG. 17, at a start of the transmission procedure, the mobile station unit 10 transmits the call request for the upstream one-way communication to the base station unit 20 (S601). After the step 601 is performed, the mobile station unit 10 determines whether a communication channel designation, sent by the base station unit 20, is received (S602). When the result at the step S602 is negative, the procedure of FIG. 17 is terminated. When the result at the step S602 is affirmative, the mobile station unit 10 shifts the current channel to the communication channel designated by the base station unit 20 (S603).

After the step S603 is performed, the mobile station unit 10 searches a sync word SW in the communication channel in order to synchronize the communication channel (S604). The mobile station unit 10 determines whether the communication channel is synchronized (S605). When the result at the step S605 is negative, the mobile station unit 10 determines whether a timeout occurs (S606). When the result at the step S606 is negative, the steps S604 and S605 are repeated. When the result at the step S606 is affirmative, the procedure of FIG. 17 is terminated.

On the other hand, when the result at the step S605 is affirmative, the synchronization of the communication channel is achieved. The mobile station unit 10 transmits a one-way communication message to the base station unit 20 by using the upstream communication channel (S607). The mobile station unit 10 determines whether an end of the one-way communication message is detected (S608). When the result at the step S608 is negative, the step S607 is repeated until the end of the message is detected. When the result at the step S68 is affirmative, the procedure of FIG. 17 is terminated.

When the call request message transmission (the upstream one-way communication) is started at the mobile station unit 10 during the receiving of the group communication, the receiving of the group communication is temporarily stopped and the procedure of FIG. 17 is performed.

In the mobile communication system of the present embodiment, the call request, transmitted by the mobile station unit 10 in the above case, is delivered to the central control unit 30 via the base station unit 20. In response to the call request, the central control unit 30 determines whether the vacant channel actually exists with respect to the radio zone of the base station unit 20 where the mobile station unit 10 originating the call request is located. When the vacant channel exits, the central control unit 30 assigns the vacant channel to the mobile station unit 10 originating the call request. Then the central control unit 30 transmits a result of the channel assignment concerning the mobile station unit 10 to the base station unit 20.

The base station unit 20 transmits a call setup acknowledge message to the mobile station unit 10 by using the SCCH of the downstream control channel or the SACCH of the downstream communication channel. Further, the base station unit 20 transmits a radio channel designation to the mobile station unit 10 so that a call setup processing between the base station unit 20 and the mobile station unit 10. When the call setup is completed, the base station unit 20 transmits an access allowance message to the mobile station unit 10.

FIG. 18 shows an access allowance message that is transmitted to the mobile station unit 10 by the base station unit 20 in the above case. As shown in FIG. 18, the access allowance message includes a message kind (which indicates a radio channel designation), a frequency code, a slot number, a scramble code (for communication channel), a mobile-station transmit power designation (for communication channel), and channel information (for communication channel), and each of these data elements includes the upstream/downstream (UP/DN) direction, the mandatory/option (M/O) kind, the data length, and others.

When the access allowance message, sent by the base station unit 20, is received, the mobile station unit 10 shifts the current channel to the upstream communication channel (the vacant channel) that is designated by the base station unit 20 with the downstream control channel. The mobile station unit 10 accesses the downstream communication channel that corresponds to the designated upstream communication channel, and establishes synchronization of the downstream communication channel. Then the mobile station unit 10 performs a new one-way communication by using the designated upstream communication channel (the vacant channel).

In a case in which the mobile station unit 10 that is in a receiving condition of the group communication (using the downstream communication channel) receives the access allowance message from the base station unit 20, the mobile station unit 10 terminates the group communication and starts performing a new one-way communication by using the designated upstream communication channel (the vacant channel).

In the above-described embodiment, when the access allowance message sent by the base station unit 20 is received, the mobile station unit 10 accesses the downstream communication channel that corresponds to the designated upstream communication channel, and establishes synchronization of the downstream communication channel. In this case, the mobile station unit 10 can establish synchronization of the downstream communication channel by receiving an SSB (or a sync burst signal) sent with the downstream communication channel, and therefore it can establish synchronization of the upstream communication channel (the vacant channel).

Figure 19:
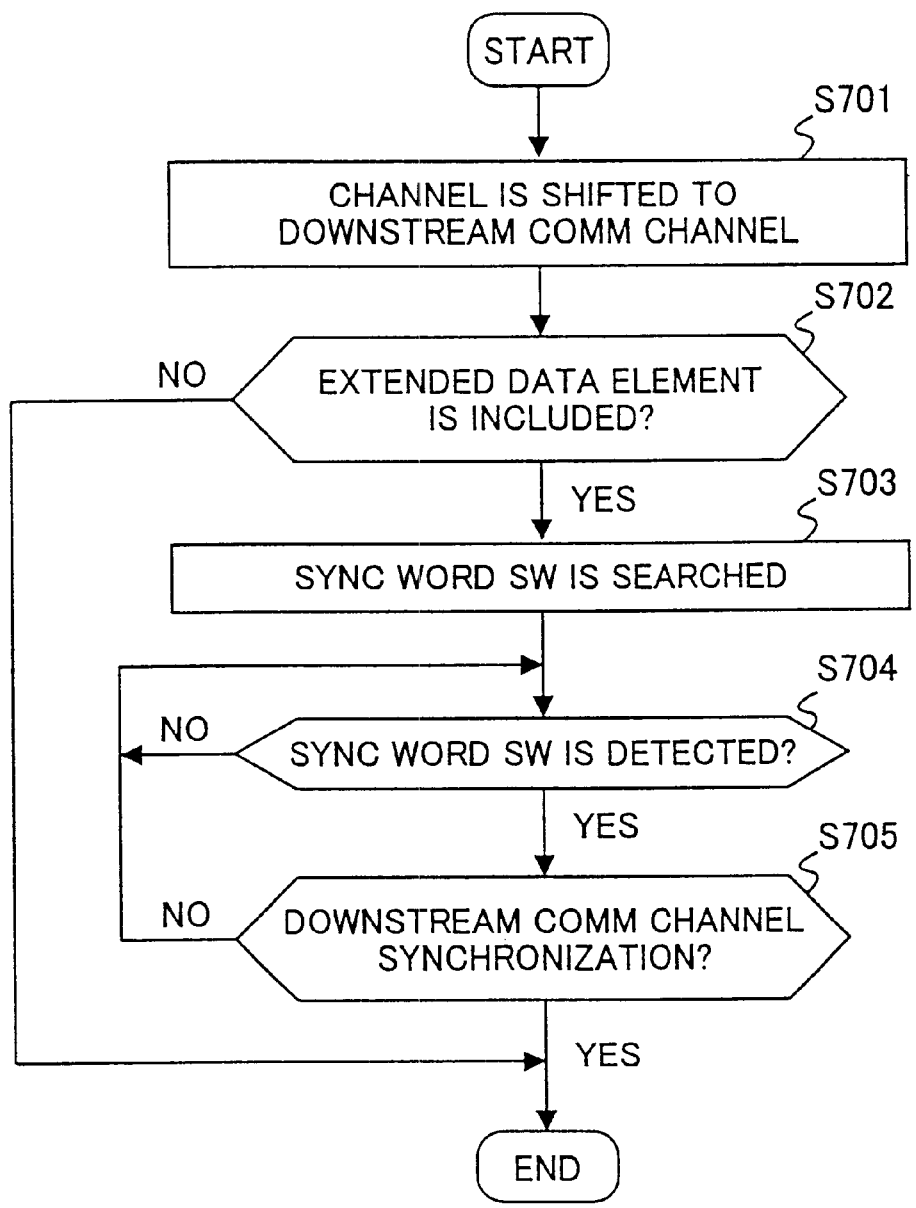
FIG. 19 is a flowchart for explaining a communication channel synchronization procedure executed by the mobile station unit.
Figure 20:
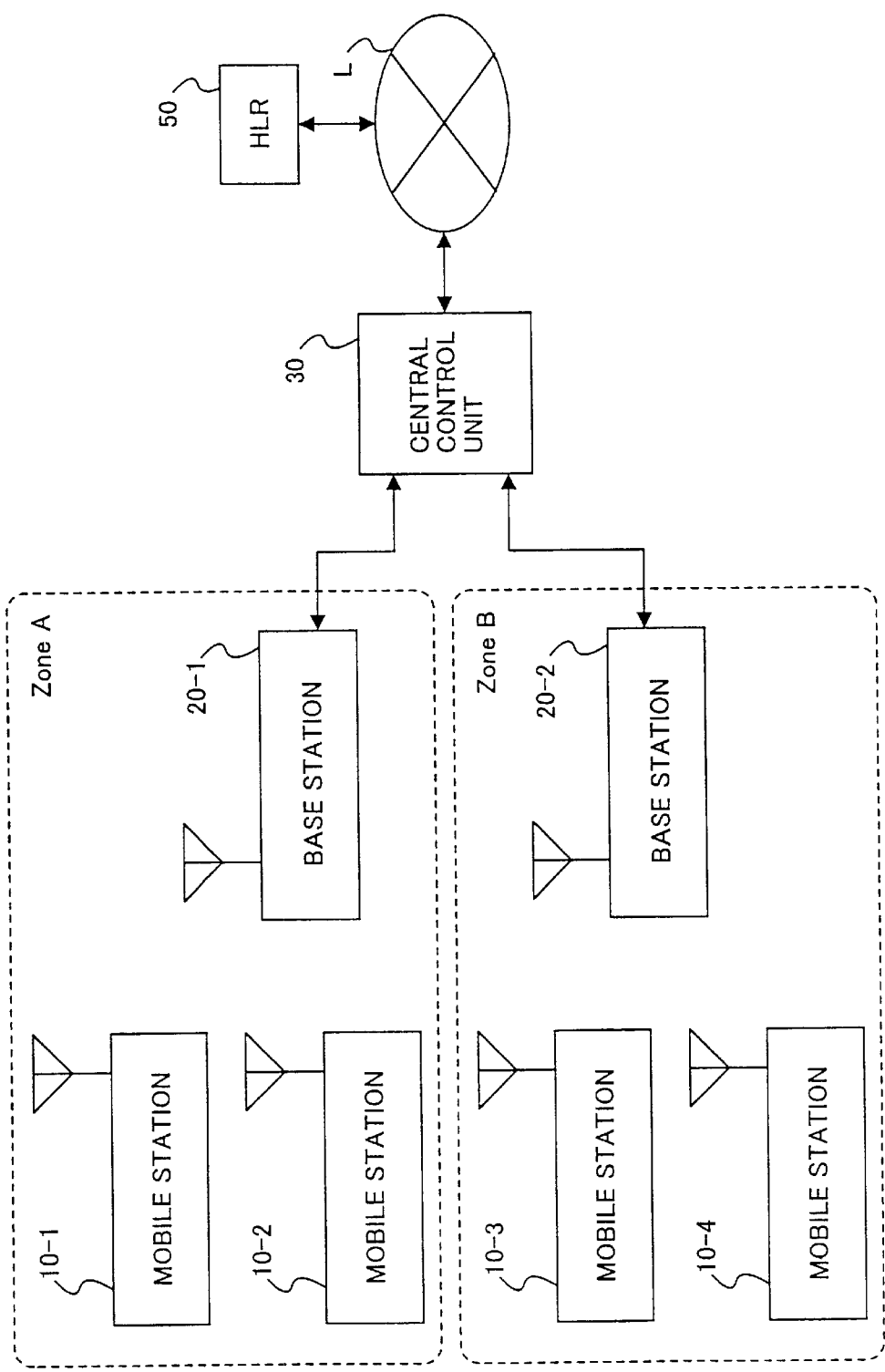
FIG. 20 is a block diagram of a conventional mobile communication system.
Figure 21:
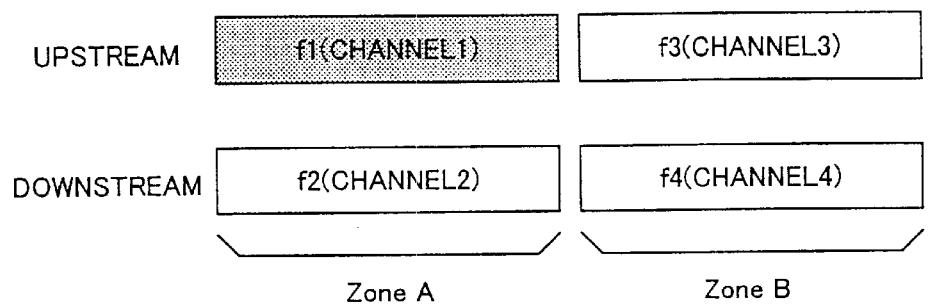
FIG. 21 is a diagram for explaining a channel assignment of the conventional mobile communication system in which radio channels are assigned to the mobile stations.

FIG. 19 shows a communication channel synchronization procedure executed by the mobile station unit 10 in the above case.

As shown in FIG. 19, at a start of the communication channel synchronization procedure, the mobile station unit 10 shifts the current channel to the downstream communication channel that is used for the group communication (S701). As described above, this downstream communication channel corresponds to the upstream communication channel (the vacant channel) that is designated by the base station unit 20 with the downstream control channel. However, if the mobile station unit 10 is in a receiving condition of the group communication, the mobile station unit 10 does not perform the step S701.

After the step S701 is performed, the mobile station unit 10 determines whether the extended data element is included in the message that is received from the downstream control channel (S702). When the result at the step S702 is negative, the procedure of FIG. 19 is terminated.

When the result at the step S702 is affirmative, the mobile station unit 10 searches a sync word SW in the received message (S703). The mobile station unit 10 determines whether the sync word SW in the received message is detected (S704). The step S704 is repeated until the result at the step S704 is affirmative. When the result at the step S704 is affirmative, the mobile station unit 10 determines whether synchronization of the downstream communication channel is established (S705). The step S705 is repeated until the result at the step S705 is affirmative. When the result at the step S705 is affirmative, the mobile station unit 10 can establish synchronization of the upstream communication channel (the vacant channel). The procedure of FIG. 19 is terminated.

In the mobile communication system of the present embodiment, after a call setup between the mobile station units 10 is established for a new one-way communication, the base station unit 20 (the broadcast message portion 25) transmits a broadcast message, indicating the prevention of a call request using the upstream communication channel (the vacant channel), to other mobile station units 10 that can perform the one-way communication. In particular, the number of vacant channels in the communication state information shown in FIG. 10 is decreased by one, and the base station unit 20 transmits the broadcast message including the decreased number of vacant channels to other mobile station units 10.

Further, there is a case in which the mobile station units 10 in the group communication include a transmitter mobile station unit 10, located in the radio zone of the base station unit 20, and a receiver mobile station unit 10, not located in the radio zone of the base station unit 20. In the above case, the downstream communication channel corresponding to the upstream communication channel used by the transmitter mobile station unit 10 in the group communication is unused (or the vacant channel). Suppose that a demand for performing a new one-way communication takes place in the above case. In the mobile communication system of the present embodiment, the central control unit 30 transmits the vacant channel data, indicating that the downstream communication channel is unused (the vacant channel), to a second base station unit 20 of the receiver mobile station unit 10, and the receiver mobile station unit 10 performs a receiving procedure of the new one-way communication that uses the downstream communication channel (the vacant channel).

In the above case, there is no mobile station unit 10, which is in a receiving condition of the group communication, in the radio zone of the base station unit 20 where the transmitter mobile station unit 10 of the group communication exists. The receiver mobile station unit 10 uses the downstream communication channel (the vacant channel) to perform the receiving procedure of the new one-way communication, as follows.

For example, when a demand for downstream one-way transmission of character information (sent by facsimile) or voice information (sent by telephone) to the mobile station unit 10 via the base station unit 20 takes place, a calling message is transmitted to the mobile station unit 10 by using the broadcast control channel. When the mobile station unit 10 responds to the calling message, the downstream communication channel that is unused is preferentially assigned to the mobile station unit 10, and the downstream one-way communication is initiated. The calling message (the BCCH) includes a message kind and a receiver station identifier, and each of these data elements include the upstream/downstream (UP/DN) direction and the mandatory/option (M/O) kind.

As described in the foregoing, in the mobile communication system of the present embodiment, the base station unit 20 transmits a broadcast message to each mobile station unit 10 by using the downstream control channel or the downstream communication channel, and the mobile station unit 10 can independently determine whether the vacant channel exists, and can transmit, if it exists, a call request for a one-way communication, which uses the vacant channel, to the base station unit 20. Further, the call request, transmitted by the mobile station unit 10, is delivered to the central control unit 30 via the base station unit 20. In response to the call request, the central control unit 30 determines whether the vacant channel actually exists in the radio zone of the base station unit 20 where the mobile station unit 10 originating the call request is located. When the vacant channel exits, the central control unit 30 assigns the vacant channel to the mobile station unit 10 originating the call request. In the communication state monitor portion 34 of the central control unit 30, the vacant channel data stored in the channel management memory is updated as a result of this channel assignment. The central control unit 30 transmits the resulting vacant channel data concerning the mobile station unit 10 to the base station unit 20.

Accordingly, the mobile communication system of the above-described embodiment is effective in providing efficient use of the available frequency channels. It is not necessary to perform a preliminary communication in order to ensure the channel needed for the mobile station unit to perform a one-way communication. The mobile communication system of the above-described embodiment can carry out a one-way communication with efficient use of the vacant channels as in the group communication performed by the conventional mobile communication system.

Alternatively, the transmission of a broadcast message of the communication state information to each mobile station unit 10 may be omitted. In such alternative embodiment, it is also possible to carry out the one-way communication using the vacant channel. Namely, the mobile station unit 10 starts the call request processing when a given key operation is manually performed by the user on the mobile station unit 10, or automatically starts the call request processing.

In the above-described embodiment, the communication state monitor portion 23 and the communication state monitor portion 34 are provided in the base station unit 20 and the central control unit 30, respectively. Alternatively, a single communication state monitor portion may be provided in one of the base station unit 20 and the central control unit 30 or in another part of the mobile station unit 10.

The present invention is not limited to the above-described embodiments, and variations and modifications may be made without departing from the scope of the present invention.

Further, the present invention is based on Japanese priority application No.2000-086703, filed on Mar. 27, 2000, the entire contents of which are hereby incorporated by reference.

What is claimed is:

1. A mobile communication system in which a central control unit assigns pairs of upstream and downstream channels to mobile station units located in a radio zone of a base station unit to carry out a two-way communication between the mobile station units, and the central control unit assigns pairs of upstream and downstream channels to the mobile station units to carry out a one-to-multiple group communication between the mobile station units, comprising:

a memory unit, provided in the central control unit, storing vacant channel data indicative of the presence of a vacant channel with respect to the group communication carried out by the channel assignment of the central control unit;

a broadcast message unit, provided in the base station unit, transmitting a broadcast message containing the vacant channel data, stored in the memory unit, to each of the mobile station units;

a message receiving unit, provided in one of the mobile station units, receiving the broadcast message transmitted by the broadcast message unit; and a call request transmission unit, provided in said one of the mobile station units, transmitting, when the vacant channel data of the received message indicates the presence of the vacant channel, a call request for a one-way communication using the vacant channel, to the base station unit, wherein the central control unit assigns the vacant channel to said one of the mobile station units in response to a call request for a one-way communication using the vacant channel, which is sent by said one of the mobile station units, and updates the vacant channel data, stored in the memory unit, as a result of the assignment of the vacant channel.

2. The mobile communication system according to claim 1, wherein said message receiving unit receives the broadcast message from a predetermined information area of a downstream communication channel when said one of the mobile station units is in a receiving condition of the group communication, and said message receiving unit receives the broadcast message from a predetermined information area of a downstream control channel when said one of the mobile station units is in a waiting condition.

3. The mobile communication system according to claim 1, wherein each of the mobile station units includes a channel management memory storing the vacant channel data contained in the broadcast message that is received when the mobile station unit is in one of a waiting condition and a receiving condition of the group communication, and the call request transmission unit determines whether the vacant channel exists, based on the vacant channel data stored in the channel management memory, and, when the vacant channel is determined as existing, the call request transmission unit transmits the call request.

4. The mobile communication system according to claim 1, wherein the mobile station units in the group communication include a transmitter mobile station unit and a receiver mobile station unit, and the central control unit is configured to transmit, when the transmitter mobile station unit is located in the radio zone of the base station unit and the receiver mobile station unit is not located in the radio zone, and a downstream communication channel corresponding to an upstream communication channel used by the transmitter mobile station unit in the group communication is unused, vacant channel data, indicating that the downstream communication channel is unused, to a second base station unit of the receiver mobile station unit, so that the receiver mobile station unit uses the downstream communication channel to perform a receiving procedure of a new one-way communication.

5. A mobile communication system in which a central control unit accesses a home location register that manages location information of respective mobile station units, the central control unit assigning pairs of upstream and downstream channels to mobile station units located in a radio zone of a base station unit to carry out a two-way communication between the mobile station units, and the central control unit assigning pairs of upstream and downstream channels to the mobile station units to carry out a one-to-multiple group communication between the mobile station units, the mobile station units in the group communication including a transmitter mobile station unit and a receiver mobile station unit, comprising:

a channel control unit, provided in the central control unit, transmitting, when the transmitter mobile station unit is located in the radio zone and the receiver mobile station unit is not located in the radio zone, vacant channel data, indicating that an upstream communication channel corresponding to a downstream communication channel used in the group communication is unused, to a second base station unit of the receiver mobile station, the channel control unit assigning, when a call request for a one-way communication using the upstream communication channel is received from the second base station unit, the upstream communication channel to the receiver mobile station unit; and a call request transmission unit, provided in the receiver mobile station unit, transmitting, when the vacant channel data transmitted by the channel control unit is received, the call request for the one-way communication, to the second base station unit, so that the receiver mobile station unit performs the one-way communication using the upstream communication channel.

6. The mobile communication system according to claim 5, wherein the call request transmission unit accesses, when performing the one-way communication using the upstream communication channel, the downstream communication channel, and establishes synchronization of the downstream communication channel.

7. The mobile communication system according to claim 5, wherein the receiver mobile station unit includes a message receiving unit receiving a broadcast message containing the vacant channel data, transmitted by the second base station unit, the message receiving unit receives the broadcast message from a predetermined information area of a downstream communication channel when the receiver mobile station unit is in a receiving condition of the group communication, and the message receiving unit receives the broadcast message from a predetermined information area of a downstream control channel when the receiver mobile station unit is in a waiting condition.

8. A control unit for use in a mobile communication system, comprising:

a first unit assigning pairs of upstream and downstream channels to mobile station units located in a radio zone of a base station unit to carry out a two-way communication between the mobile station units;

a second unit assigning pairs of upstream and downstream channels to the mobile station units located in the radio zone of the base station unit to carry out a one-to-multiple group communication between the mobile station units;

a memory unit storing vacant channel data indicating the presence of a vacant channel with respect to the group communication carried out by the channel assignment of the second unit;

a transmission unit transmitting the vacant channel data, stored in the memory unit, to a desired one of the mobile station units via the base station unit; and a vacant channel data unit assigning the vacant channel to the desired one of the mobile station units in response to a call request for a one-way communication using the vacant channel, which is sent by the desired one of the mobile station units, and the vacant channel data unit updating the vacant channel data, stored in the memory unit, as a result of the assignment of the vacant channel.

9. A mobile station unit for use in a mobile communication system, comprising:

a call setup unit establishing a call between the mobile station unit and a base station unit having a radio zone where the mobile station unit is located;

a control unit receiving, when the mobile station unit is in one of a waiting condition and a receiving condition of a group communication, vacant channel data sent by the base station unit, the vacant channel data indicating the presence of a vacant channel in the group communication, the control unit storing the received channel data into a memory area of the mobile station unit, and determining whether the vacant channel exists, based on the stored channel data; and a transmission unit transmitting, when the control unit determines that the vacant channel exists, a call request for a one-way communication using the vacant channel to a central control unit via the base station unit.

* * * * *